(12) United States Patent
Shah et al.

(10) Patent No.: US 10,198,260 B2
(45) Date of Patent: Feb. 5, 2019

(54) PROCESSING INSTRUCTION CONTROL TRANSFER INSTRUCTIONS

(71) Applicant: Oracle International Corporation, Redwood City, CA (US)

(72) Inventors: Manish Shah, Austin, TX (US); Christopher Olson, Austin, TX (US)

(73) Assignee: Oracle International Corporation, Redwood Shores, CA (US)

(*) Notice: Subject to any disclaimer, the term of this patent is extended or adjusted under 35 U.S.C. 154(b) by 232 days.

(21) Appl. No.: 14/994,796

(22) Filed: Jan. 13, 2016

(65) Prior Publication Data

US 2017/0199741 A1    Jul. 13, 2017

(51) Int. Cl.
G06F 9/38    (2018.01)
G06F 9/30    (2018.01)
G06F 9/32    (2018.01)

(52) U.S. Cl.
CPC .......... G06F 9/30058 (2013.01); G06F 9/321 (2013.01); G06F 9/3804 (2013.01)

(58) Field of Classification Search
CPC .................................................. G06F 9/3806
See application file for complete search history.

(56) References Cited

U.S. PATENT DOCUMENTS

| | | | |
|---|---|---|---|
| 5,799,162 A | 8/1998 | Christie et al. | |
| 5,909,573 A | 6/1999 | Sheaffer | |
| 6,347,369 B1* | 2/2002 | Witt | G06F 9/30021 711/E12.043 |
| 7,647,473 B2* | 1/2010 | Kamigata | G06F 8/447 712/24 |
| 7,765,387 B2 | 7/2010 | Sunayama et al. | |
| 2002/0078332 A1* | 6/2002 | Seznec | G06F 9/3806 712/240 |
| 2004/0015683 A1* | 1/2004 | Emma | G06F 9/3806 712/240 |
| 2005/0204120 A1* | 9/2005 | Prasky | G06F 9/325 712/238 |
| 2005/0268075 A1* | 12/2005 | Caprioli | G06F 9/3806 712/239 |
| 2008/0082807 A1* | 4/2008 | Stempel | G06F 9/30149 712/240 |
| 2009/0313462 A1* | 12/2009 | Emma | G06F 9/3005 712/240 |

(Continued)

*Primary Examiner* — Andrew Caldwell
*Assistant Examiner* — Michael J Metzger
(74) *Attorney, Agent, or Firm* — Meyertons, Hood, Kivlin, Kowert & Goetzel, P.C.

(57) ABSTRACT

A system that for storing program counter values is disclosed. The system may include a program counter, a first memory including a plurality of sectors, a first circuit configured to retrieve a program instruction from a location in memory dependent upon a value of the program counter, send the value of the program counter to an array for storage and determination a predicted outcome of the program instruction in response to a determination that execution of the program instruction changes a program flow. The second circuit may be configured to retrieve the value of the program counter from a given entry in a particular sector of the array, and determine an actual outcome of the program instruction dependent upon the retrieved value of the program counter.

20 Claims, 7 Drawing Sheets

(56) References Cited

U.S. PATENT DOCUMENTS

| | | | |
|---|---|---|---|
| 2010/0031011 A1* | 2/2010 | Chen | G06F 9/3806 |
| | | | 712/240 |
| 2010/0169625 A1* | 7/2010 | Wang | G06F 9/3806 |
| | | | 712/239 |
| 2011/0016292 A1* | 1/2011 | McDonald | G06F 9/3844 |
| | | | 712/208 |
| 2011/0238952 A1 | 9/2011 | Kai et al. | |
| 2013/0311760 A1 | 11/2013 | Kothari et al. | |

* cited by examiner

PROCESSING INSTRUCTION CONTROL TRANSFER INSTRUCTIONS

BACKGROUND

Technical Field

This invention relates to computing systems, and more particularly, to techniques for processing control transfer instructions.

Description of the Related Art

Computing systems include multiple multi-threaded processors each of which may execute multiple software instructions associated with various programs. To achieve improved performance, a multi-threaded processor may execute multiple software instructions in parallel, as well as execute software instructions in a different order than the instructions are arranged in their corresponding program.

The software instructions may include instructions, which can change the program flow. Such software instructions are commonly referred to as control transfer instructions (CTI) and may include instructions that cause the program flow to branch or jump to a different address from which to retrieve subsequent instructions. In some cases, the change in address is specified as an offset from a current value of a program counter (PC).

To maintain performance during program flow changes, processors may speculatively fetch and execute instructions beyond a CTI. Circuitry included in a processor may predict a direction and a target of the CTI. Once the direction and target have been predicted, the processor may begin to fetch instructions from the path predicted following the CTI.

SUMMARY OF THE EMBODIMENTS

Various embodiments of an apparatus and method for storing a program counter value in a computing system are disclosed. Broadly speaking, a method and apparatus are contemplated in which a first memory includes a plurality of sectors and each sector includes a plurality of entries, and a fetch circuit is configured to retrieve a program instruction from a location in a second memory dependent upon a value of a program counter circuit. The fetch circuit may be further configured to store the value of the program counter circuit in the first memory and determine a predicted outcome of the program instruction in response to a determination that execution of the program instruction changes a program flow. An execution circuit may be configured to retrieve the value of the program counter circuit from the given entry of a particular sector of the first memory and determine an actual outcome of the program instruction dependent upon the retrieved value of the program counter circuit.

In a non-limiting embodiment, the value of the program counter circuit corresponds to a logical address of the program instruction in the first memory. In another embodiment, to determine the actual outcome of the of the program instruction, the second circuit may be further configured to execute the program instruction.

In one implementation, to determine the actual outcome of the program instruction, the second circuit may be further configured to determine an actual direction and an actual target of the program instruction.

Figure 1:
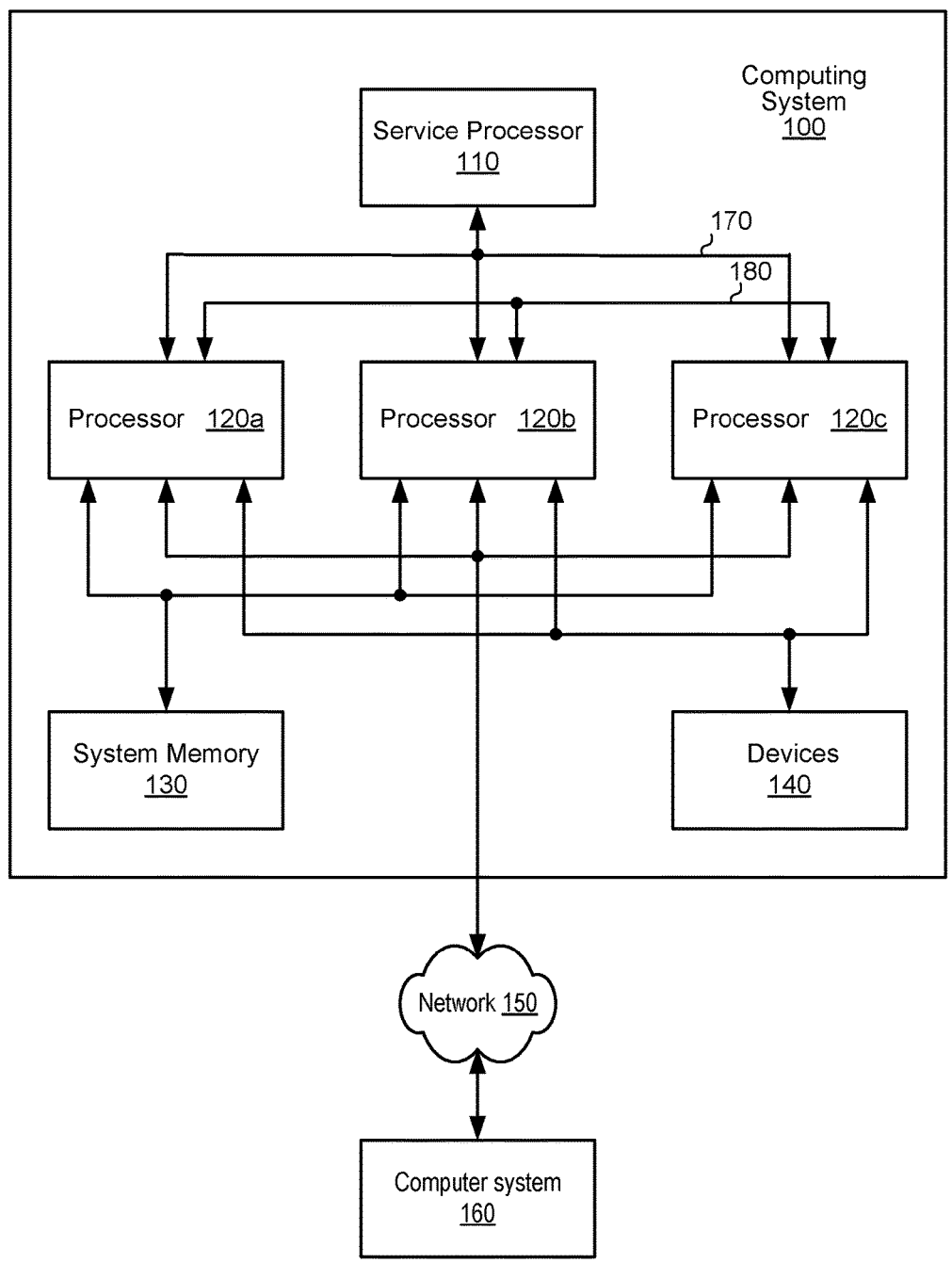
FIG. 1 is a block diagram of an embodiment of a distributed computing system.

While the disclosure is susceptible to various modifications and alternative forms, specific embodiments thereof are shown by way of example in the drawings and will herein be described in detail. It should be understood, however, that the drawings and detailed description thereto are not intended to limit the disclosure to the particular form illustrated, but on the contrary, the intention is to cover all modifications, equivalents and alternatives falling within the spirit and scope of the present disclosure as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

Processors included in a computing system may predict a direction and target of a CTI, and then fetch and execute instructions along the predicted path. A Branch Execution Unit (BRU) included in a processor may execute the CTI to determine the actual direction and target address of the CTI. The BRU may then compare the predicted direction and target address to the actual direction and target address to determine if the prediction was correct. If the prediction was not correct (commonly referred to as a "misprediction"), then instructions fetched and executed along the predicted path are flushed, and an Instruction Fetch Unit (IFU) included in the processor is redirected to fetch instructions from the corrected target address In order for the BRU to determine the actual direction and target of a CTI, the BRU must have access to the value of the PC corresponding to the CTI. In some processors, the PC value is passed along with the CTI through the processor's pipeline from fetch to execution. In multi-threaded processors, multiple software threads may be concurrently active in the processor, and circuitry may be dedicated to storing a state of each active thread. In such cases, the value of the PC for each CTI would have to be maintained to allow the BRU access to values at execution. The additional circuitry to store the various CTI values may result in additional area and power consumption within a processor. The embodiments illustrated in the drawings and described below may provide techniques for proving a PC value to the BRU while minimizing the impact on area and power.

A block diagram illustrating one embodiment of a computing system 100 is shown in FIG. 1. In the illustrated embodiment, computing system 100 includes a service processor 110, coupled to a plurality of processors 120a-c through bus 170. It is noted that in some embodiments, system processor 110 may additionally be coupled to system memory 130 through bus 170. Processors 120a-c are, in turn, coupled to system memory 130, and peripheral storage device 140. Processors 120a-c are further coupled to each other through bus 180 (also referred to herein as "coherent interconnect 180"). Computing system 100 is coupled to a network 150, which is, in turn coupled to a computer system 160. In various embodiments, computing system 100 may be configured as a rack-mountable server system, a standalone system, or in any suitable form factor. In some embodiments, computing system 100 may be configured as a client system rather than a server system.

System memory 130 may include any suitable type of memory, such as Fully Buffered Dual Inline Memory Module (FB-DIMM), Double Data Rate, Double Data Rate 2, Double Data Rate 3, or Double Data Rate 4 Synchronous Dynamic Random Access Memory (DDR/DDR2/DDR3/DDR4 SDRAM), or Rambus® DRAM (RDRAM®), for example. It is noted that although one system memory is shown, in various embodiments, any suitable number of system memories may be employed.

Devices 140 may, in some embodiments, include magnetic, optical, or solid-state storage media such as hard drives, optical disks, non-volatile random-access memory devices, etc. In other embodiments, devices 140 may include more complex storage devices such as disk arrays or storage area networks (SANs), which may be coupled to processors 120a-c via a standard Small Computer System Interface (SCSI), a Fiber Channel interface, a Firewire® (IEEE 1394) interface, or another suitable interface. Additionally, it is contemplated that in other embodiments, any other suitable devices may be coupled to processors 120a-c, such as multi-media devices, graphics/display devices, standard input/output devices, etc.

As described in greater detail below, each of processors 120a-c may include one or more processor cores and cache memories. In some embodiments, each of processors 120a-c may be coupled to a corresponding system memory, while in other embodiments, processors 120a-c may share a common system memory. Processors 120a-c may be configured to work concurrently on a single computing task and may communicate with each other through coherent interconnect 180 to coordinate processing on that task. For example, a computing task may be divided into three parts and each part may be assigned to one of processors 120a-c. Alternatively, processors 120a-c may be configured to concurrently perform independent tasks that require little or no coordination among processors 120a-c.

The embodiment of the computing system illustrated in FIG. 1 is one of several examples. In other embodiments, different numbers and configurations of components are possible and contemplated. It is noted that although FIG. 1 depicts a multi-processor system, the embodiments described herein may be employed with any number of processors, including a single processor core.

Figure 2:
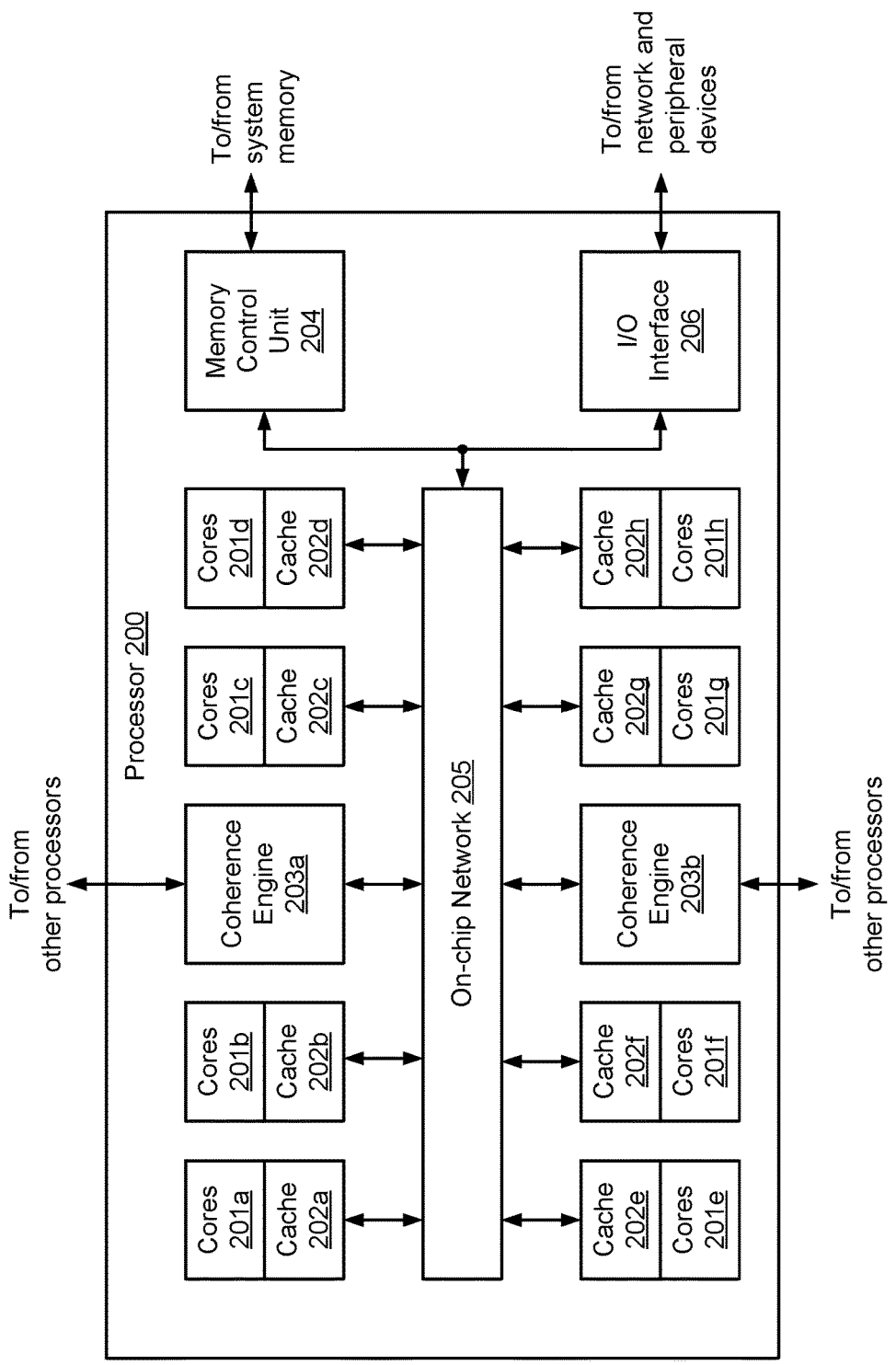
FIG. 2 is a block diagram of an embodiment of a processor.

A block diagram illustrating an embodiment of a processor is shown in FIG. 2. In some embodiments, processor 200 may correspond to processors 120a-c of computing system 100 in FIG. 1. In the illustrated embodiment, processor 200 includes a plurality of processor core groups 201a-h, each including one or more processor cores. It is noted that although 8 core groups are shown, in various embodiments, any suitable number of processor cores may be employed. Each of core groups 201a-h is coupled to a respective one of cache memory partitions 202a-h. Collectively, cache memory partitions 202a-h form a cache memory for the core groups 201a-h. Each of cache memory partitions 202a-h is coupled to on-chip network 205, which is, in turn coupled to memory control unit 204. In various embodiments, memory control unit 204 is coupled to one or more banks of system memory, also referred to herein as main memory (not shown). Processor 200 further includes coherence engines 203a-b, which are also coupled to on-chip network 205 as well as to other processors.

Each of core groups 201a-h may include one or more processor cores, and be configured to execute instructions and to process data according to a particular instruction set architecture (ISA). In one embodiment, core groups 201a-h may be configured to implement the SPARC® V9 ISA, although in other embodiments it is contemplated that any desired ISA may be employed, such as x86, PowerPC® or MIPS®, for example. In the illustrated embodiment, each of core groups 201a-h may be configured to operate independently of the others, such that all core groups 201a-h may execute in parallel. Additionally, in some embodiments each of core groups 201a-h may be configured to execute multiple threads concurrently on a separate processor core, where a given thread may include a set of instructions that may execute independently of instructions from another thread.

On-chip network 205 may allow communication between cache memory partitions 202a-h, memory resources through memory control unit 204, and I/O interface 206, and other processors through Coherence Engine 203a-b. Although not directly connected to on-chip network 205, core groups 201a-h may indirectly communicate with the external resources through cache memory partitions 202a-h. In some embodiments, multiple communication protocols may be implemented within on-chip network 205. For example, on-chip network 205 may include a ring network, a point-to-point network, and a store-and-forward network. In various embodiments, different types of communications, such as, e.g., requests, may be transmitted over different networks.

Cache memory partitions 202a-h may, in various embodiments, collectively form a level 3 (L3) cache memory for processor 200. By using separate cache memory partitions, an individual processor core group, such as, e.g., core group 201a may have high-speed access to data stored in its associated cache memory partition 202a, thereby reducing latency. In such a system, however, the multiple cache memory partitions need to maintain coherency with respect to each other. Cache memory partitions 202a-h may, in various embodiments, implement one of numerous coherency protocols, such as, e.g., MOESI, MESI, or any suitable cache coherency protocol.

Memory control unit 204 may be configured to manage the transfer of data between cache memory partitions 202a-h and system memory, for example in response to fill requests and data evictions. In some embodiments, multiple instances of memory control unit 204 may be implemented, with each instance configured to control a respective bank of system memory. Memory control unit 204 may be configured to interface to any suitable type of system memory, such as described above in reference to FIG. 1 In some embodiments, memory control unit 204 may be configured to support interfacing to multiple different types of system memory.

I/O interface 206 may be configured to coordinate data transfer between processor 200 and one or more devices or other computing systems. Such devices may include, without limitation, storage, display, multimedia, or any other suitable type of peripheral device. In one embodiment, I/O interface 206 may implement one or more instances of an interface such as Peripheral Component Interface Express (PCI Express™), Ethernet (IEEE 802.3) networking standard such as Gigabit Ethernet or 10-Gigabit Ethernet, or any other suitable interface standard or combination of interface standards.

It is noted that the embodiment illustrated in FIG. 2 is merely an example. In other embodiments, different functional units, different numbers of cores, caches and functional units, and different configurations of cores, caches, and functional units are possible and contemplated.

Figure 3:
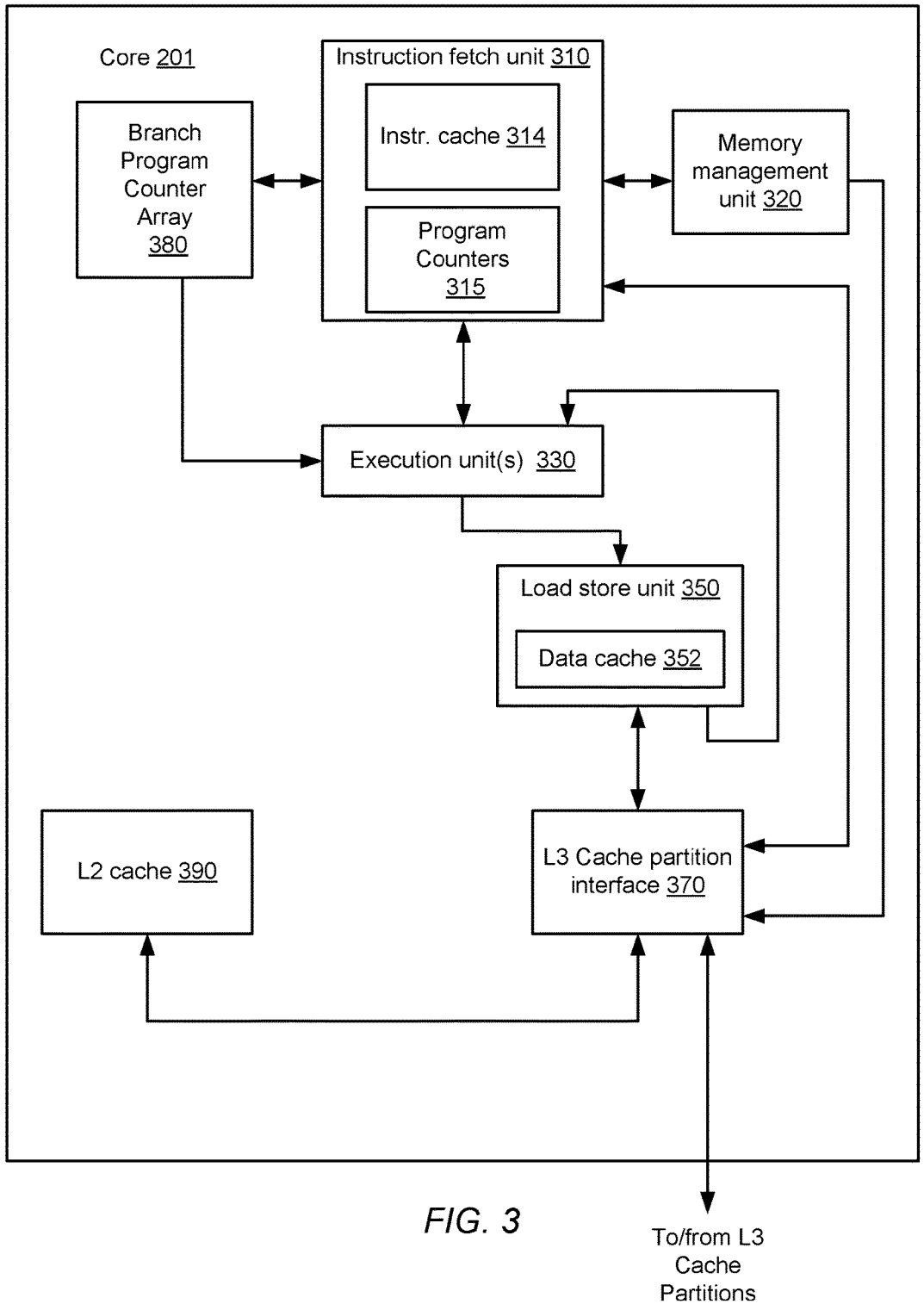
FIG. 3 is a block diagram of an embodiment of a processor core.

A possible embodiment of a core included in core groups 201a-h is illustrated in FIG. 3. In the illustrated embodiment, core 201 includes an instruction fetch unit (IFU) 310 coupled to a memory management unit (MMU) 320, a L3 cache partition interface 370, a branch program counter array (BPCA) 380, a L2 cache memory 390, and one or more of execution units 330. Execution unit 330 is coupled to load store unit (LSU) 350. Each of the latter units is also coupled to send data back to each of execution units 330. Additionally, LSU 350, L2 cache memory 390 and MMU 320 are coupled to L3 cache partition interface 370, which may in turn be coupled to on-chip network 205 as shown in FIG. 2.

Instruction fetch unit 310 may include circuitry configured to provide instructions to the rest of core 201 for execution. In the illustrated embodiment, IFU 310 may be configured to perform various operations relating to the fetching of instructions from cache or memory, the selection of instructions from various threads for execution, and the decoding of such instructions prior to issuing the instructions to various functional units for execution. Instruction fetch unit 310 includes instruction cache 314 and program counter 315. In one embodiment, program counters 315 may generate multiple values corresponding to addresses of instructions to be fetched for respective threads being executed by core 201. In some embodiments, program counters 315 may include one or more sequential logic circuits configured to generate the aforementioned values. IFU 310 may include logic to coordinate the retrieval of instructions from instruction cache 314 according to those addresses.

Additionally, in some embodiments IFU 310 may include logic circuits to predict outcomes of CTIs. To predict an outcome of a CTI, IFU 310 may predict if instructions will continue to be fetched along the current path of addresses, or branch to a new address from which to start fetching address. This is commonly referred to as "predicting a direction" of the CTI. Additionally, IFU 310 may predict a fetch target address (also referred to herein as a "predicted target") corresponding to a new address location from which to retrieve subsequent instructions. Such logic circuits may include a Branch History Table (BHT), Branch Target Buffer (BTB), or other suitable structure, for example. One or more values in program counters 315 may be updated based on predicted branch outcomes of the branch predictions thereby allowing for instruction fetching along a predicted path.

As described below in more detail, BPCA 380 may be configured to store values from program counters 315 that correspond to CTIs. Each value from program counters 315 stored in BPCA 380 may have an associated tag that is passed along with the CTI from IFU 310 to execution unit(s) 330 and indicates a storage location within BPCA 380 where the corresponding program value is stored. In various embodiments, multiple values may be stored corresponding to CTIs encountered in various threads being executed by core 201. As the CTIs are transferred from IFU 310 to Execution Unit(s) 330 for execution, the program counter values corresponding to the CTIs may be retrieved from BPCA 380 to allow Execution unit(s) 330 to determine if the prediction regarding a given CTI was correct, or if it was a misprediction, as explain below.

Execution unit(s) 330 may include circuitry configured to execute and provide results for certain types of instructions issued from IFU 310. In one embodiment, execution unit(s) 330 may be configured to execute certain integer-type instructions defined in the implemented ISA, such as arithmetic, logical, and shift instructions. It is contemplated that in some embodiments, core 201 may include more than one execution unit 330, and each of the execution units may or may not be symmetric in functionality. Finally, in the illustrated embodiment instructions destined for FGU 340 or LSU 350 pass through execution unit 330. In alternative embodiments, however, it is contemplated that such instructions may be issued directly from IFU 310 to their respective units without passing through execution unit 330.

When a CTI is executed, execution unit(s) 330 will determine from where to fetch further instructions, i.e., execution unit(s) 330 will determine an actual direction and actual target for the CTI. To determine the actual direction and target, execution unit(s) 330 may use the tag passed along with the CTI to retrieve the program counter value of the CTI from BPCA 380. Execution unit(s) 330 use the tag to determine a particular entry included in BPCA 380 from which to read the program counter value.

Once the CTI has been executed, and an actual direction and an actual target of the CTI have been determined, execution unit(s) 330 may determine an accuracy of the prediction made by IFU 310. To determine the accuracy of the prediction, execution unit(s) 330 compares the predicted direction to the actual direction, and the predicted target to the actual target. If the predicted direction is the same as the actual direction, and the predicted target is the same as the actual target, then the prediction made by IFU 310 was accurate. If, however, the predicted and actual direction and target values are different, then the prediction was inaccurate (commonly referred to as a "misprediction"). In response to the detection of a misprediction, execution unit(s) 330 may flush instructions younger than the CTI that are moving through processing pipelines included in execution unit(s) 330, and signal IFU 310 that the prediction for the CTI was incorrect and new instructions need to be fetched from the cache or main memory.

Load store unit 350 may be configured to process data memory references, such as integer and floating-point load and store instructions. In some embodiments, LSU 350 may also be configured to assist in the processing of instruction cache 314 misses originating from IFU 310. LSU 350 may include a data cache 352 as well as logic configured to detect cache misses and to responsively request data from a particular one of L3 cache partitions 202a-h via L3 cache partition interface 370. In one embodiment, data cache 352 may be configured as a write-through cache in which all stores are written to a given one of L3 cache partitions 202a-h regardless of whether they hit in data cache 352; in some such embodiments, stores that miss in data cache 352 may cause an entry corresponding to the store data to be allocated within the cache. In other embodiments, data cache 352 may be implemented as a write-back cache.

L2 cache memory 390 may be configured to cache instructions and data for use by execution unit 330. In the illustrated embodiment, L2 cache memory 390 may be organized into multiple separately addressable banks that may each be independently accessed. In some embodiments, each individual bank may be implemented using set-associative or direct-mapped techniques.

It is noted that the embodiment illustrated in FIG. 3 is merely an example. In other embodiments, different numbers of virtual functions, and different control mechanisms may be employed.

Figure 4A:
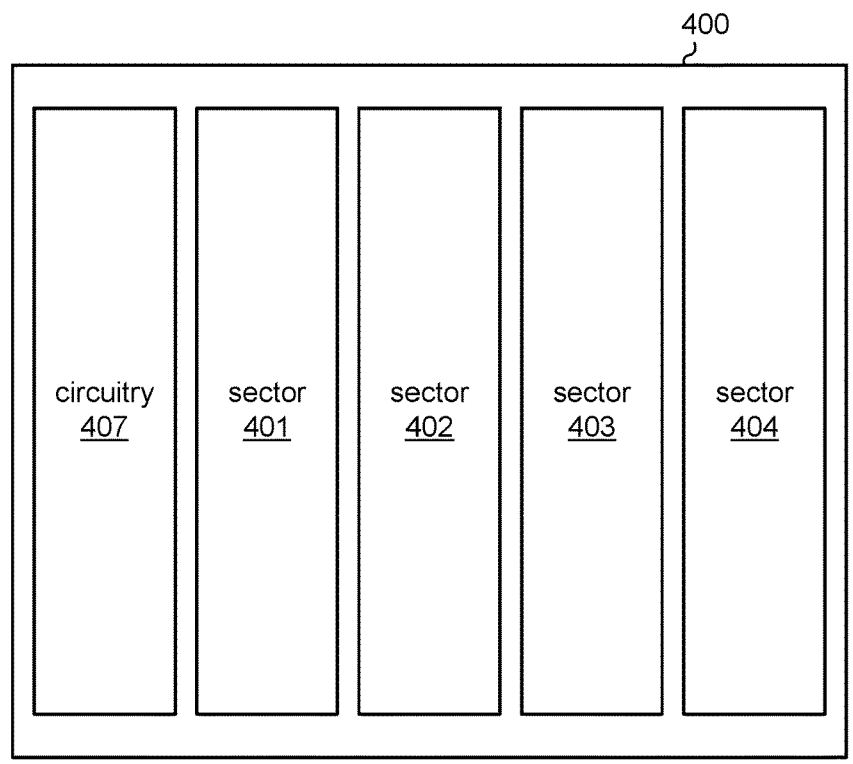
FIG. 4A illustrates a block diagram of an embodiment of a Branch Program Counter Array.

Turning to FIG. 4A, a block diagram illustrating an embodiment of a BPCA is depicted. In various embodiments, BPCA 400 corresponds to BPCA 380 of the embodiment illustrated in FIG. 3. In the illustrated embodiment, BPCA 400 includes circuitry 407 and sectors 401 through 404.

As described below in more detail, each of sectors 401 through 404 may include multiple entries, each of which may store a PC value corresponding to a particular CTI. Depending on the architecture of a given processor, multiple instructions may be concurrently fetched. For example, in some processors, four instructions may be fetched at a given time (commonly referred to as a "fetch bundle"), which may result in four CTIs being fetched at one time. In such an example, an entry in each of sectors 401 through 403 may be allocated, and a corresponding program counter value stored, in parallel, for each fetched CTI. By allowing a PC value for a given one of CTIs in the fetch bundle to be stored in a respective one of sectors 401 through 403, multi-ported storage cells may be avoided, thereby saving area and power, in some embodiments.

As used and described herein, multi-ported storage cells are storage cells which include more than one access port. Data stored in a multi-ported storage cell may be accessed, in parallel, through each access port, thereby allowing multiple other logic circuits simultaneous access to the stored data. Alternatively, or additionally, one of the ports may be used to store data into the storage cell. The addition multiple access ports into a data storage cell increases the physical size of the data storage cells, which multiplied by the number of such data storage cells on an integrated circuit die, may increase the overall area. Such area increases can affect yield and cost of the integrated circuit die. Moreover, the additional circuitry necessary to support the multiple access ports on a data storage cell may consume extra power during parallel accesses to the data storage cell.

In cases where there are an insufficient number of available entries in sectors 401 through 404 to handle the number of CTIs in a particular fetch bundle, BPCA 400 may alert the IFU, which, in turn, may stall, and stop fetching further instructions until there is sufficient space available in BPCA 400. It is noted that although four sectors are depicted in the present embodiment, any suitable number of sectors may be employed.

Circuitry 407 may, in various embodiments, include logic circuits configured to receive a program counter value associated with a CTI from an IFU, such as, IFU 310 as depicted in FIG. 3, for example. Once the program counter value is received, circuitry 407 may determine a location in one of sections 401 through 404, in which to store the newly received program counter value. In various embodiments, circuitry 407 may include one or more counters or other sequential logic circuits configured to track activity of each of sectors 401 through 404. Circuitry 407 may, in some embodiments, select one of sectors 401 through 404 based on which of sectors 401 through 404 has received a least amount of use. In some cases, circuitry 407 may generate a tag value associated with a given CTI during the allocation process, and the tag value may be sent to the IFU to be propagated with the CTI to the execution unit(s). Alternatively, the IFU may generate the tag value. The tag value may correspond to one of sectors 401 through 404 in which an entry has been allocated to store the PC value.

When a particular CTI is executed, the corresponding entry in the BPCA is read by the execution unit(s) using the tag value corresponding to the particular CTI. Circuitry 407 may use the tag value to determine a location of the desired PC value, which is, in turn, read and sent to the execution unit(s). In some cases, one sector may be read while another sector is being written. Additionally, circuitry 407 may then de-allocate, or invalidate, the entry in the BPCA corresponding to the particular CTI, once the CTI has been executed. After an entry in the BPCA has been de-allocated or invalidated, the data stored in the entry is no longer used and will be written over when the entry is re-allocated for another program counter value.

In some cases, program counter values for fetching sequential instructions are separated by a fixed distance, which may depend upon the architecture of the processor or processor core. If two sequential instructions are CTIs, then the CTIs are referred to as being "adjacent CTIs" There is a known relationship between the program counter values of adjacent CTIs. Given this known relationship, only one of program counter values corresponding to adjacent CTIs may be stored. The program counter value that is not stored may be calculated when the entry is read from BPCA 400 since the offset is know. In some embodiments, an indicator, such as, e.g., "odd" or "even" may be stored with the program counter value in BPCA 400 to indicate if the offset should be added or subtracted to the value retrieved from BPCA 400 in order to determined the other program counter for the shared entry. If an entry stores the PC value for two adjacent CTIs, then circuitry 407 de-allocates the entry once both CTIs have been executed. It is noted that although the above description describes two program counter values sharing a single entry, in other embodiments, an entry may be shared by any suitable number of program counter values.

It is noted that the architecture illustrated in FIG. 4A is merely an example. In other embodiments, different layers and different components within the layers may be employed.

Figure 4B:
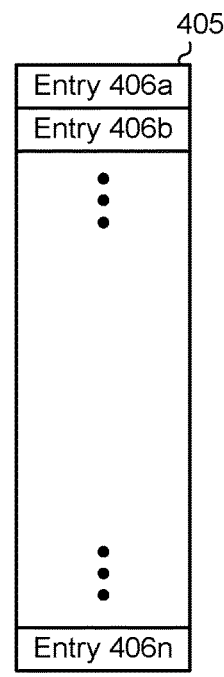
FIG. 4B illustrates a block diagram of a sector of a Branch Program Counter Array.

An embodiment of a sector of a BPCA is illustrated in FIG. 4B. In the illustrated embodiment, sector 405 may correspond to any of sectors 401 through 404 as depicted in FIG. 4A. Sector 405 includes entries 406a through 406n, each of which may be configured to store a PC value. In various embodiments, each of entries 406a through 406n may also be configured to store an odd/even flag, which may be used, as described below in more detail, when a single entry of entries 406a through 406n corresponds to two adjacent CTIs. Circuitry, such as, e.g., circuitry 407 may allocate a particular entry for use in storing a PC value. Once a stored PC value has been read and used by an execution unit, the entry that stored the PC value may be de-allocated, i.e., the entry may be made available for storing future PC values. In some embodiments, a value stored in a de-allocated entry may be erased while, in other embodiments, the value may remain stored until the entry is subsequently allocated for a new PC value.

Each of entries 406a through 406n may include multiple data storage cells, each of which may be configured to store a single data bit of a PC value. The data storage cells may be designed according to one of various design styles. For example, the data storage cells may be SRAM memory cells, DRAM memory cells, or any other suitable single port or multi-port data storage cells.

It is noted that the sector depicted in FIG. 4B is merely an example. In other embodiments, different numbers and different configurations of entries are possible and contemplated.

Figure 5:
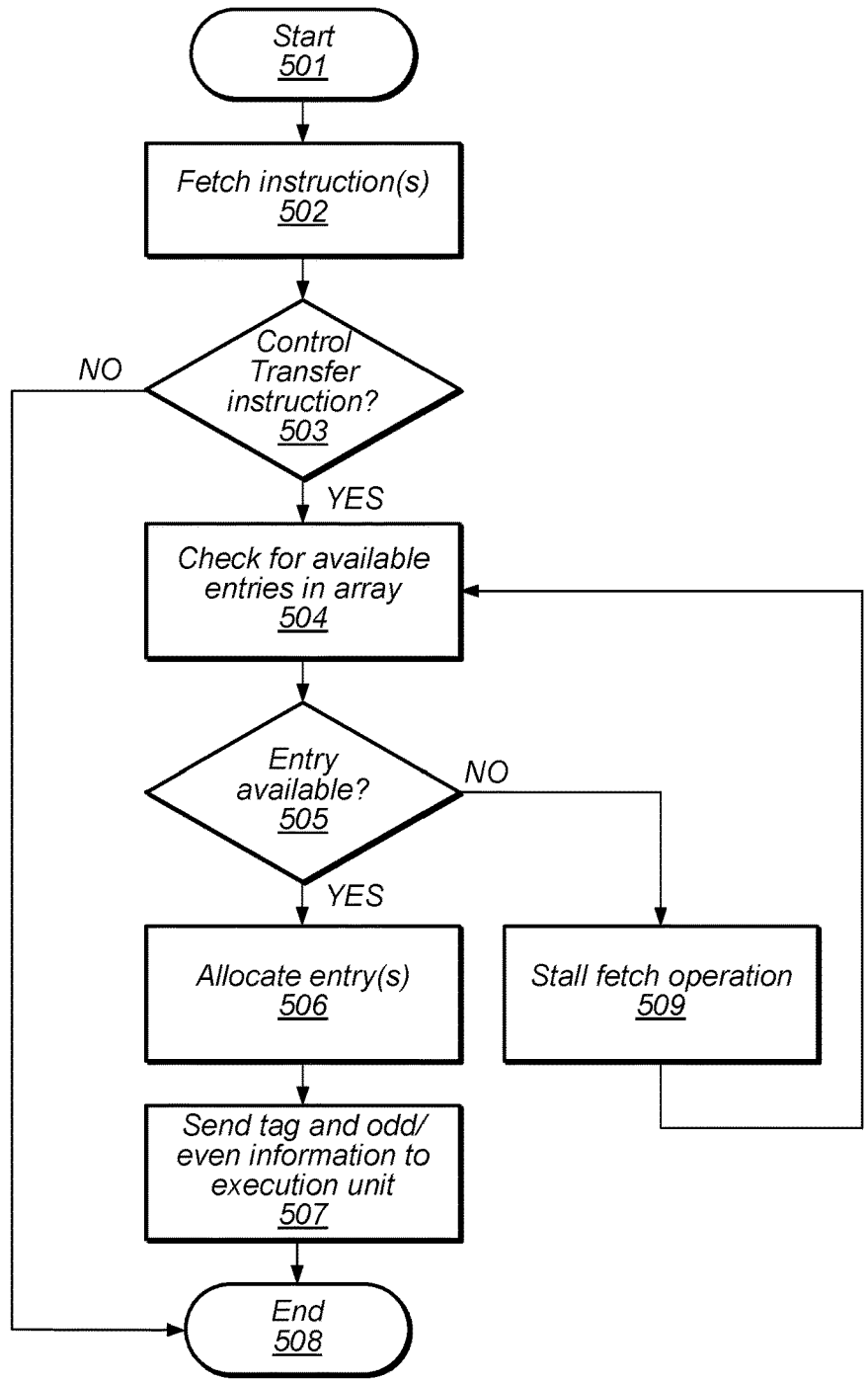
FIG. 5 illustrates a flow diagram depicting an embodiment of a method for storing a program counter value into a Branch Program Counter Array.

Turning to FIG. 5, a flow diagram illustrating an embodiment of a method for storing a program counter value into a Branch Program Counter Array is illustrated. Referring collectively to the embodiment illustrated in FIG. 3, and the flow diagram of FIG. 5, the method begins in block 501.

IFU 310 may then fetch an instruction (block 502). In various embodiments, IFU 310 may request data stored at a location in memory corresponding to a value of program counters 315. The request may be sent to L2 cache 390 or, in the event of the request data being unavailable in L2 cache 390, onto L3 cache partitions through L3 cache partition interface 370. It is noted that, in some embodiments, multiple instructions may be fetched concurrently.

The method may then depend on the type of the instruction fetched (block 503). If the fetched instruction in not a CTI, then the method may conclude in block 508. If, however, the fetched instruction is a CTI, the BPCA 380 will be checked for available entries (block 504). The method may then depend on available entries in BPCA 380 (block 505).

If there are no entries available in BPCA 380, then IFU 310 will stall further fetch operations (block 509). Once IFU 310 has been stalled, the method may continue from block 504 as described. It is noted, that in cases where multiple instructions are concurrently fetched, a number of available entries in BPCA 380 may be checked against a predetermined threshold value, and when the number of available entries is less than the threshold value, further instruction fetching may be halted.

If there are sufficient entries available in BPCA 380, one or more entries may then be allocated in BPCA 380 (block 506). During the allocation process, a tag value may be generated for each CTI's corresponding PC value. In some cases, if the CTI corresponding to the allocated entry is adjacent to a previous CTI, then additional information, i.e., an odd/even identifier may also be generated. The tag and odd/even flag information may then be sent to execution unit(s) 303 along with the corresponding CTI (block 507). Once execution unit(s) 303 have received the CTI and its associated tag and odd/even identifier, the method concludes in block 508.

Although the operations of the method illustrated in FIG. 5 are depicted as being performed in a sequential fashion, in other embodiments, one or more of the depicted operations may be performed in parallel.

Figure 6:
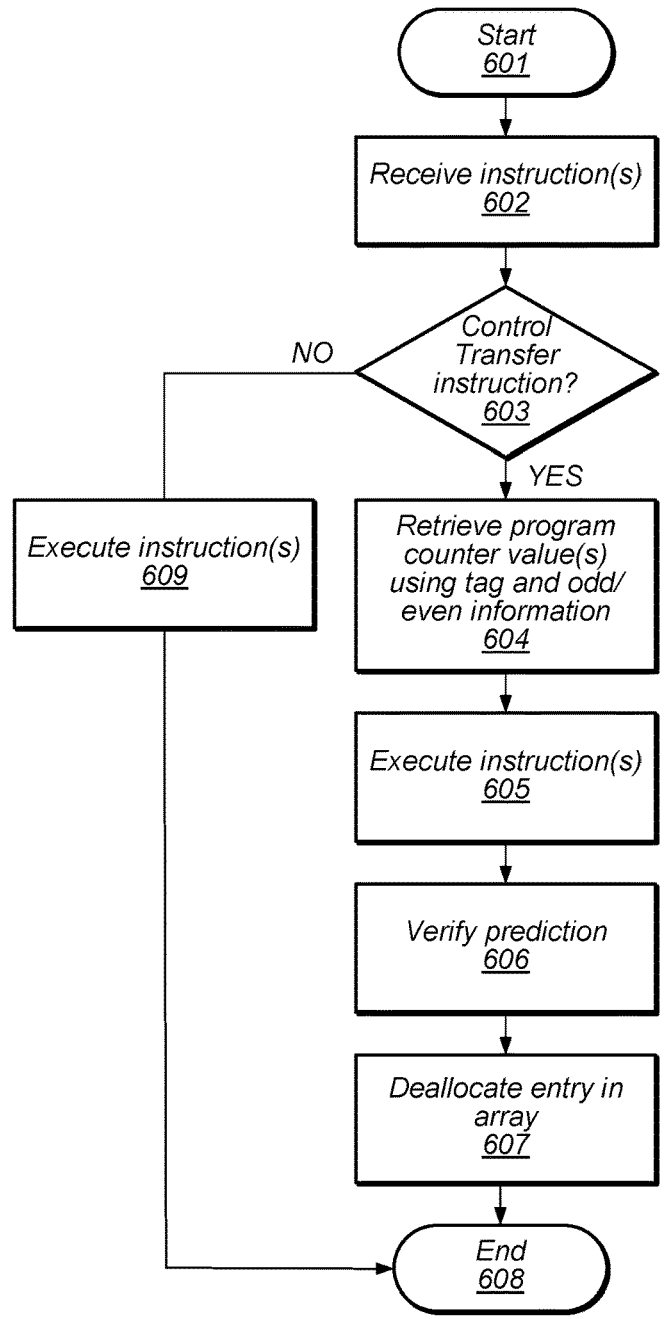
FIG. 6 illustrates a flow diagram depicting an embodiment of a method for executing a control transfer instruction and verifying a previously made prediction.

A flow diagram depicting an embodiment of a method for executing a control transfer instruction and verifying a previously made prediction is depicted in the flow diagram illustrated in FIG. 6. Referring collectively to the embodiment illustrated in FIG. 3, and the flow diagram of FIG. 6, the method begins in block 601. Execution unit(s) 330 may then receive one or more instructions (block 602). In various embodiments, IFU 310 previously fetched the received instructions from a cache or main memory. Execution unit(s) 330 may, in some embodiments, concurrently receive and process multiple instructions. The method may then depend on a type of each received instructions (block 603). If a particular instruction is not a CTI, then the particular instruction is executed (block 609), and then the method concludes in block 608.

Alternatively, if a particular instruction is a CTI, then execution unit(s) 330 may use the tag associated with the instruction to retrieve a corresponding PC value from BPCA 380 (bock 604). If the particular CTI was adjacent to another CTI in the instruction stream, an offset may be added to the retrieved PC value based upon the odd/even identifier. Once the corresponding PC value has been retrieved and, if necessary, modified, the particular instruction may then be executed (block 605). As part of the execution of the particular instruction, an actual direction and target of the particular CTI may be determined. The determined actual direction and target of the CTI may then be compared to the predicted direction and target of the particular CTI to verify the accuracy of the prediction (block 606). If it is determined that the prediction was in error, younger instructions currently in the pipelines of execution unit(s) 303 may be flushed and instructions from the correct path fetched.

Once the prediction has been verified, the entry corresponding to the particular CTI may then be de-allocated in BPCA 380 (block 607). If the entry is shared by two CTIs adjacent in the instruction stream, the entry may be de-allocated once both CTIs have been executed. With the de-allocation of the entry corresponding to the particular CTI, the method concludes in block 608.

It is noted that the flow diagram depicted in FIG. 6 is merely an example. In other embodiments, different operations and different orders of operations are possible and contemplated.

Figure 7:
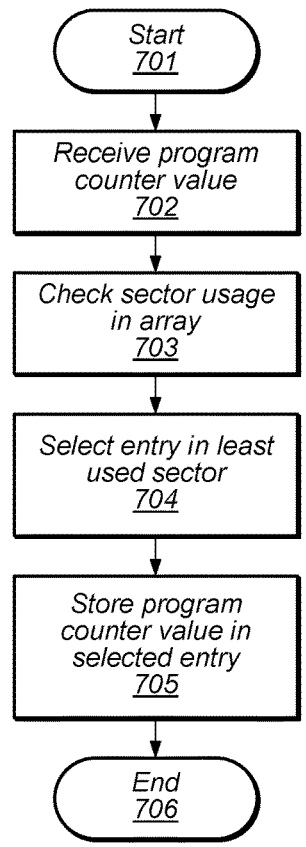
FIG. 7 illustrates a flow diagram depicting an embodiment of a method for allocating an entry in a Branch Program Counter Array.

Turning to FIG. 7, a flow diagram depicting an embodiment of a method for allocating an entry in a BPCA is illustrated. In various embodiments, the method depicted in the flow diagram of FIG. 7 may correspond to operation 506 of the flow diagram illustrated in FIG. 5. Referring collectively to the embodiment illustrated in FIG. 4, and the flow diagram of FIG. 7, the method begins in block 701. A PC value may then be received (block 702). Circuitry 407 may then check the usage of each of sectors 401 through 403 (block 703). In various embodiments, circuitry 407 may include counters or other sequential logic circuits that track a number of times entries are allocated in each of sections 401 through 403.

Circuitry 407 may determine which sector of sectors 401 through 403 is least frequently used, and select an entry within the least frequently used sector (block 704). The received PC value may then be stored in the selected entry (block 705). Once the received PC value has been stored in the selected entry, the method may conclude in block 706.

It is noted that the embodiment of the method illustrated in FIG. 7 is merely an example. In other embodiments, different operations and different orders of operations may be employed.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. An apparatus, comprising:
a program counter circuit;
a first memory including a plurality of sectors, wherein each sector includes a plurality of entries;
a fetch circuit configured to:
  retrieve a plurality of program instructions from respective locations in a second memory, wherein each of the respective locations is referenced using a corresponding value of the program counter circuit;
  in response to a determination that each of two sequential program instructions of the plurality of program instructions affect a program flow:
    store a value of the program counter circuit corresponding to an initial program instruction of the two sequential program instructions and an offset to a subsequent program instruction of the two sequential program instructions, in a first entry of a first sector of the first memory; and
    determine a predicted outcome of the program instruction; and
an execution circuit configured to:
  retrieve the value of the program counter circuit from the first entry of the first sector of the first memory using a tag associated with the value; and
  determine an actual outcome of the initial program instruction using the value of the program counter circuit.

2. The apparatus of claim 1, wherein the value of the program counter circuit corresponds to a logical address of the initial program instruction in the first memory.

3. The apparatus of claim 1, wherein to determine the actual outcome of the initial program instruction, the execution circuit is further configured to execute the initial program instruction.

4. The apparatus of claim 1, wherein to determine the actual outcome of the initial program instruction, the execution circuit is further configured to determine an actual direction and an actual target of the initial program instruction.

5. The apparatus of claim 1, wherein to store the value of the program counter circuit, the first memory is further configured to allocate the first entry of the plurality of entries of the first sector based on a level of activity of each sector of the plurality of sectors.

6. The apparatus of claim 5, wherein the first memory is further configured to allocate, in parallel with allocating the first entry, a second entry of the plurality of entries of a second sector for another value of the program counter circuit corresponding to another program instruction.

7. A method, comprising:
retrieving, by a fetch circuit of a processor, a plurality of program instruction from respective locations in system memory, wherein each of the respective locations is referenced using a corresponding value of a program counter circuit;
in response to determining that each of two sequential program instructions of the plurality of program instructions affect a program flow:
  storing a value of the program counter circuit corresponding to an initial program instruction of the two sequential program instructions and an offset to a subsequent program instruction of the two sequential program instructions, in an array; and
  determining, by the fetch circuit, a predicted outcome of the program instruction; and
retrieving, by an execution circuit of a processor, the value of the program counter circuit from the array using a tag value associated with the value; and
determining, by the execution circuit, an actual outcome of the of the initial program instruction using the value of the program counter circuit.

8. The method of claim 7, wherein the value of the program counter circuit corresponds to a logical address of the program instruction in the system memory.

9. The method of claim 7, wherein determining, by the execution circuit, the actual outcome of the program instruction includes executing, by the execution circuit, the program instruction.

10. The method of claim 7, wherein the array includes a plurality of sectors, and wherein storing the value of the program counter circuit by an array includes selecting a particular sector of the plurality of sectors, based on a level of activity of each sector of the plurality of sectors.

11. The method of claim 10, wherein storing the value of the program counter circuit includes generating a tag corresponding to a location in the system memory, in which the value of the program counter circuit is stored.

12. The method of claim 10, wherein each sector of the plurality of sectors includes a plurality of entries, and wherein storing the value of the program counter circuit includes allocating a given entry of the plurality of entries of the particular sector of the plurality of sectors.

13. The method of claim 10, further comprising stalling a retrieval of additional program instructions from the system memory, in response to determining that no entries are available in a plurality of entries of each sector of the plurality of sectors to store the value of the program counter circuit.

14. A system, comprising:
a memory; and
a processor including a storage array and a program counter circuit, wherein the processor is configured to:
  retrieve a plurality of program instructions from respective locations in the memory, wherein each of the respective locations is referenced using a corresponding value of the program counter circuit;
  in response to a determination that each of two sequential program instructions of the plurality of program instructions affect a program flow:
    store a value of the program counter circuit corresponding to an initial program instruction of the two sequential program instructions and an offset to a subsequent program instruction of the two sequential program instructions, to the storage array; and
    determine a predicted outcome of the program instruction; and
  retrieve the value of the program counter circuit from the storage array using a tag associated with the value; and
  determine an actual outcome of the initial program instruction using the value of the program counter circuit.

15. The system of claim 14, wherein the value of the program counter circuit corresponds to a logical address of the initial program instruction in the memory.

16. The system of claim 14, wherein to determine the actual outcome of the initial program instruction, the processor is further configured to execute the initial program instruction.

17. The system of claim 14, wherein to determine the actual outcome of the initial program instruction, the processor is further configured to determine an actual direction and an actual target of the initial program instruction.

18. The system of claim 14, wherein the storage array includes a plurality of sectors, wherein each sector includes a plurality of entries, and wherein to store the value of the program counter circuit, the processor is further configured to allocate, in parallel, a first entry in a first sector of the plurality of sectors and a second entry in a second sector of the plurality of sectors based on a level of activity of each sector of the plurality of sectors.

19. The system of claim 18, wherein the first entry is shared by a different program instruction, wherein execution of the different program instruction changes the program flow, and wherein the processor is further configured to de-allocate the first entry in response to a determination that both of the initial program instruction and the different program instruction have been executed.

20. The system of claim 18, wherein the processor is further configured to stall retrieval of additional program instructions from the memory in response to a determination that no entries are available in a plurality of entries of each sector of the plurality of sectors to store the value of the program counter circuit.

* * * * *

UNITED STATES PATENT AND TRADEMARK OFFICE
CERTIFICATE OF CORRECTION

PATENT NO. : 10,198,260 B2
APPLICATION NO. : 14/994796
DATED : February 5, 2019
INVENTOR(S) : Shah et al.

Page 1 of 1

It is certified that error appears in the above-identified patent and that said Letters Patent is hereby corrected as shown below:

In the Specification

In Column 1, Line 56, delete "of the of the" and insert -- of the --, therefor.

In Column 2, Line 50, delete "address" and insert -- address. --, therefor.

In Column 8, Line 22, after "CTIs"" insert -- . --.

In Column 8, Line 28, delete "know." and insert -- known. --, therefor.

In the Claims

In Column 12, Line 9, in Claim 7, delete "of the of the" and insert -- of the --, therefor.

Signed and Sealed this
Twenty-eighth Day of January, 2020

Andrei Iancu
*Director of the United States Patent and Trademark Office*